United States Patent [19]
Tseng

[11] Patent Number: 5,526,069
[45] Date of Patent: Jun. 11, 1996

[54] EYEGLASSES WITH LENSES REPLACEABLE

[76] Inventor: Liang-Chin Tseng, 1-3, Shih Fen, Shih Fen Tsun, Chi-Ku Hsiang, Tainan Shien, Taiwan

[21] Appl. No.: 345,945

[22] Filed: Nov. 28, 1994

[51] Int. Cl.⁶ .............................. G02C 1/00; G02C 5/12
[52] U.S. Cl. .............................. 351/86; 351/83; 351/121; 351/136; 351/138
[58] Field of Search .................................. 351/83, 86, 41, 351/44, 47, 57, 103, 106, 111, 120, 123, 140, 141, 154, 88, 78, 136, 138; 2/242, 243

[56] References Cited

U.S. PATENT DOCUMENTS

| | | | |
|---|---|---|---|
| 4,196,982 | 4/1980 | Watkins | 351/154 |
| 4,340,282 | 7/1982 | Murakami | 351/154 |
| 5,387,949 | 2/1995 | Tackles | 351/121 |

*Primary Examiner*—William L. Sikes
*Assistant Examiner*—Hung Xuan Dang

[57] ABSTRACT

Eyeglasses with lenses replaceable comprising a lens frame and a plurality of pairs of lenses to be selectably used and fitted in two lens holes of the lens frame by a user with easiness without need of any tools, each lens hole and each lens having the same shape, each lens hole having a circumferential wedge-shaped ridge to engage exactly with a circumferential wedge-shaped groove of each lens, each lens hole and each lens having a wedge-shape position portion and a nearly-round fitting portion to correspond with each other so that each lens may fit in each lens hole with firm stability.

4 Claims, 6 Drawing Sheets

EYEGLASSES WITH LENSES REPLACEABLE

DETAILED DESCRIPTION OF THE INVENTION

This invention concerns eyeglasses with lenses changeable, particularly those having their lenses possible to be easily removed off the lens frame and other lenses of different color possible to be fitted in the lens frame by a user according to user's taste or the weather, etc.

Conventional eyeglasses have lenses of only one color fixed firmly in a lens frame, and the lenses cannot be changed easily by a user.

SUMMARY OF THE INVENTION

A main object of this invention is to offer a pair of eyeglasses having their lenses replaceable by a user.

Another object of this invention is to offer a pair of eyeglasses which has two lens holes of a lens frame and two lenses of the same shape as the lens holes, and the lens holes and the lenses all respectively have a position portion and a fitting portion on their circumference so that a user can remove and fit lenses in the lens holes with convenience.

Another object of this invention is to offer a pair of eyeglasses wherein lenses can be fitted firmly in the lens frame by means of engagement of a wedge-shaped ridge and a wedge-shaped groove, engagement of the position portions and engagement of the fitting portions, without using any tools or heating for expansion.

One more object of this invention is to offer a pair of eyeglasses which has a lens frame and lenses all having the same curvature, giving impression that they are formed as integral, except the color being different from each other.

The main feature of this invention is that the lens holes of the lens frame respectively have a position portion on one side and a fitting portion on the other side, and a circumferential wedge-shaped ridge formed with two sloped surfaces and a tip line where the two sloped surfaces meet, and that the lenses respectively have a position portion and a fitting portion at the corresponding location of the counterpart of the lens frame, and a circumferential groove formed with two sloped surfaces and a bottom line where the two surface meet each other. And the two slopes surfaces are one slide surface and one stop surface.

DETAILED DESCRIPTION OF THE INVENTION

Figure 1:
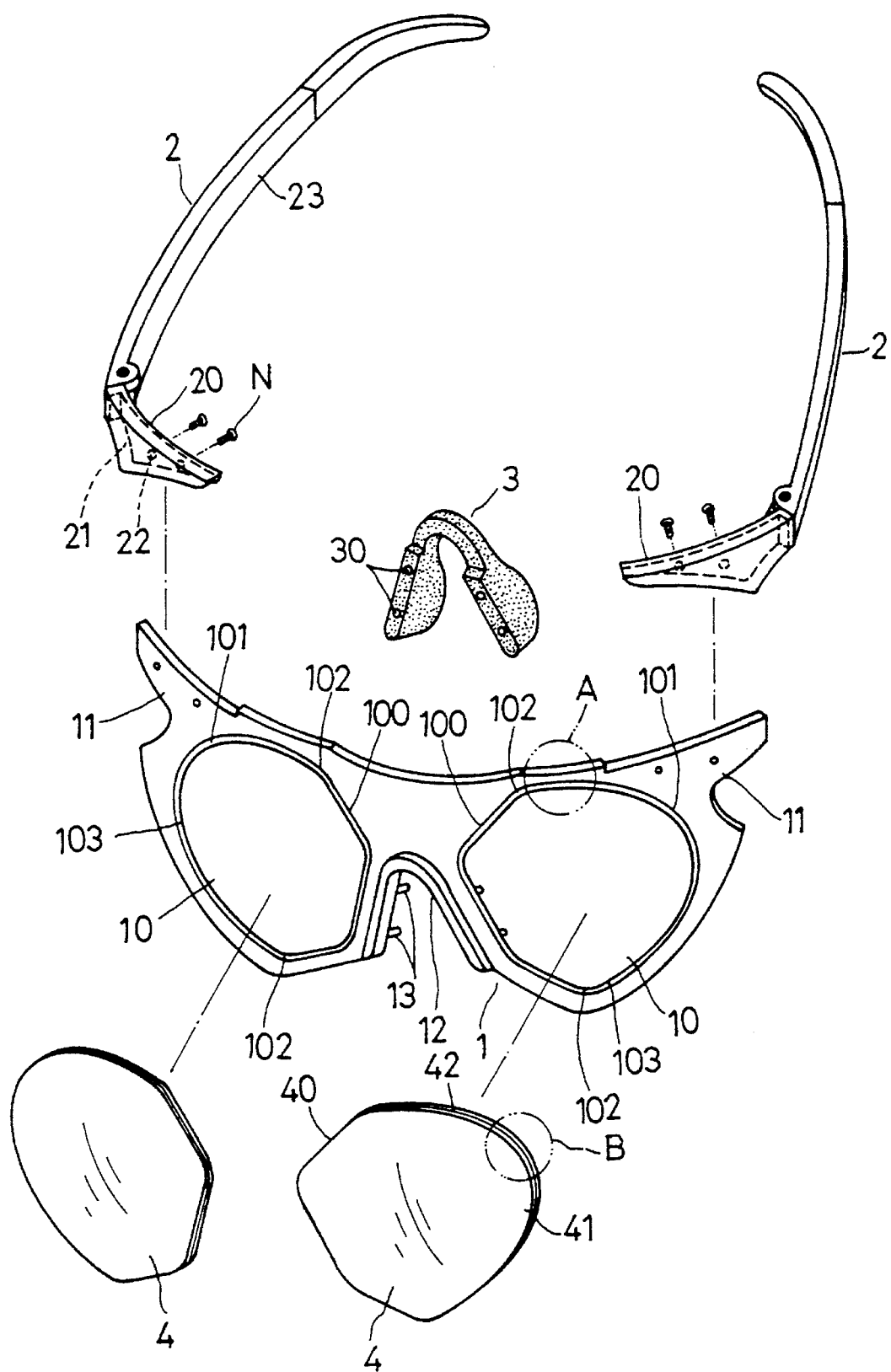
FIG. 1 is an exploded perspective view of a pair of eyeglasses with lenses replaceable in the present invention.
Figure 2:
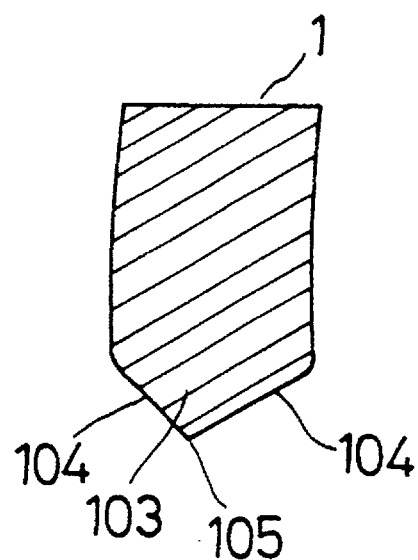
FIG. 2 is a cross-sectional view of the part A in FIG. 1.
Figure 3:
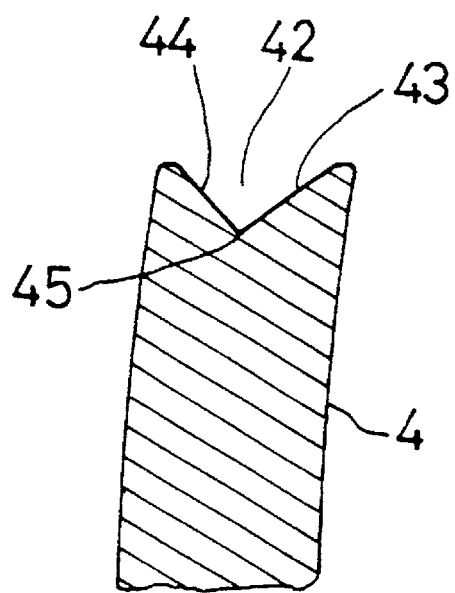
FIG. 3 is a cross-sectional view of the part B in FIG. 1.

A pair of eyeglasses with lenses replaceable in the present invention, as shown in FIG. 1, comprises a lens frame 1, two temples 2, 2, a nose piece 3, and two lenses 4, 4 combined together.

The lens frame 1 has two lens holes 10, 10 for lenses to be fitted therein, and each lens hole 10 has a wedge-shaped position portion 100 on one side, a fitting portion 101 with a nearly-round curvature, a contact point 102 of the position portion 100 and the fitting portion 101, a circumferential contact ridge 103 of a wedge shaped formed with two sloped surfaces 104, 104 and having a tip line 105 at the meeting location of the two sloped surfaces 104, 104. A connecting portion 11 is respectively formed at two opposite ends of the lens frame 1, and a sharp curve 12 sloping up in the middle portion, and two spaced projections 13, 13 extending sideway from the two opposite portions of the cute curve 12.

The two temples 2, 2 respectively have a connector 20 pivotally connected with the upper end thereof and each connector 20 is to be connected with each connecting portion 11 of the lens frame 1. Each connector 20 has a nearly triangular shape, a mid-hollow space 21 and two holes 22, 22 in the bottom wall of the hollow space 21. Each temple 2 has an end portion 23 a little curved inward.

The nose piece 3 is shaped as the same curvature as the shape curve 12 of the lens frame 1, having two spaced holes 30, 30 in two opposite sides for the projections 13 of the curve 12 to fix the nose piece 3 with the lens frame 1.

The two lenses 4, 4 are to be fitted in the holes 10, 10 of the lens frame 1, having the same shape as the holes 10, a wedge-shaped position portion 40 on one side, and a nearly-round fitting portion 41 on the other side, and a circumferential groove 42 formed with a slide surface 43 of a small angle and a stop surface 44 of a large angle and a bottom line 45 where the two surfaces 43, 44 meet each other.

Figure 4:
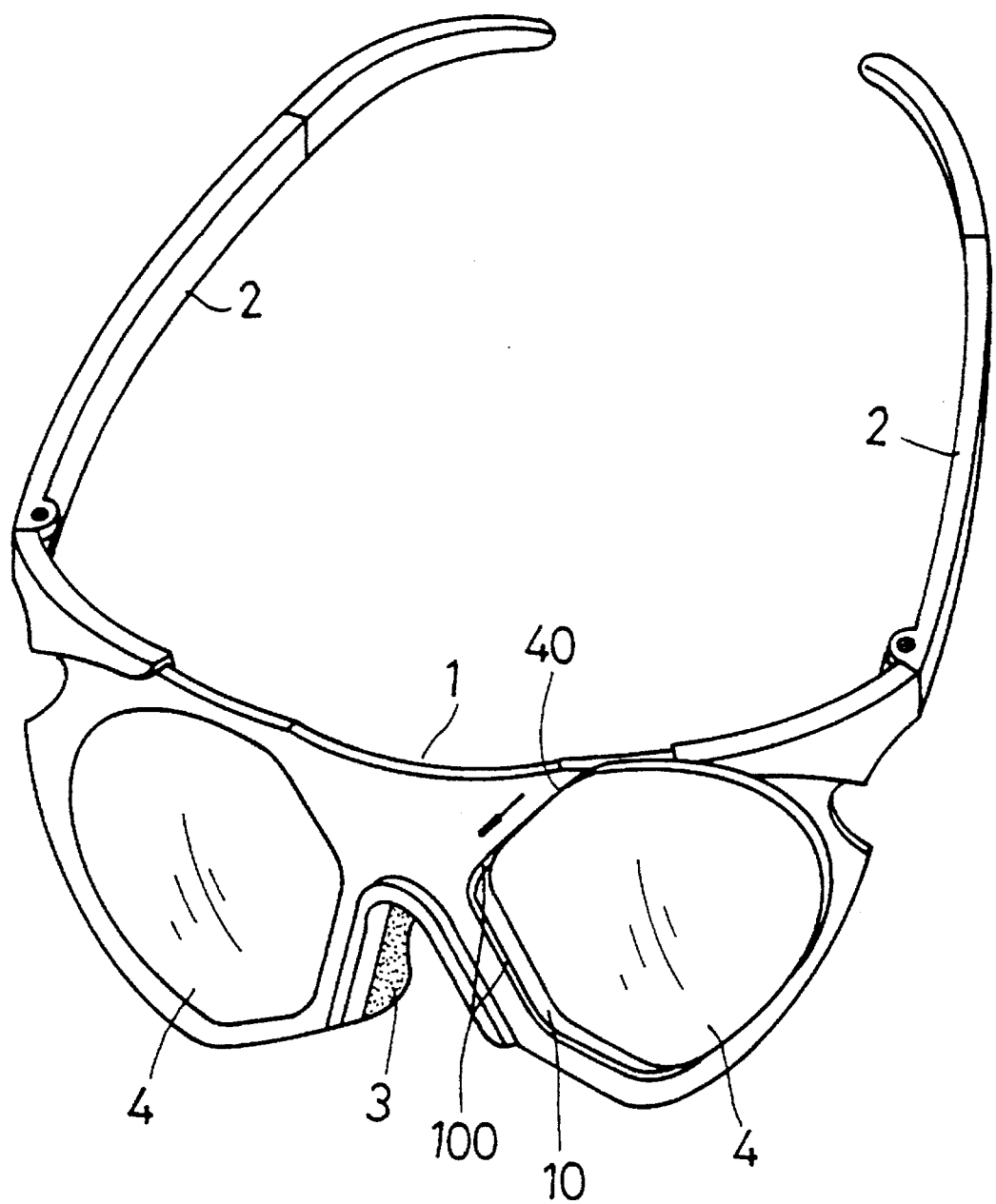
FIG. 4 is a perspective view of the eyeglasses in the present invention.
Figure 5:
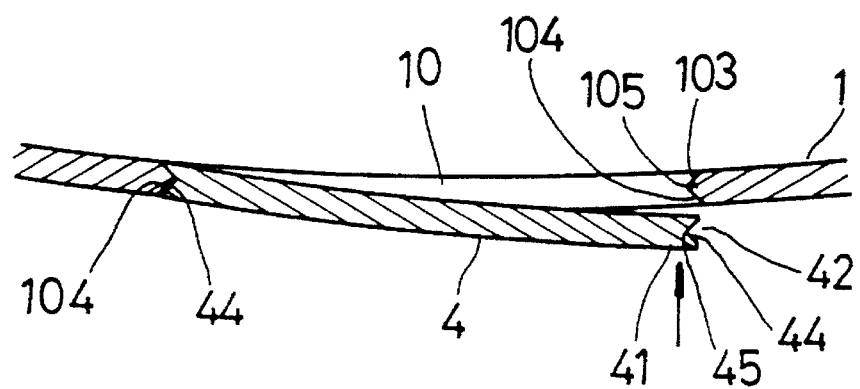
FIG. 5 is a cross-sectional view of a lens and a lens frame in the eyeglasses with lenses replaceable in the present invention.
Figure 6:
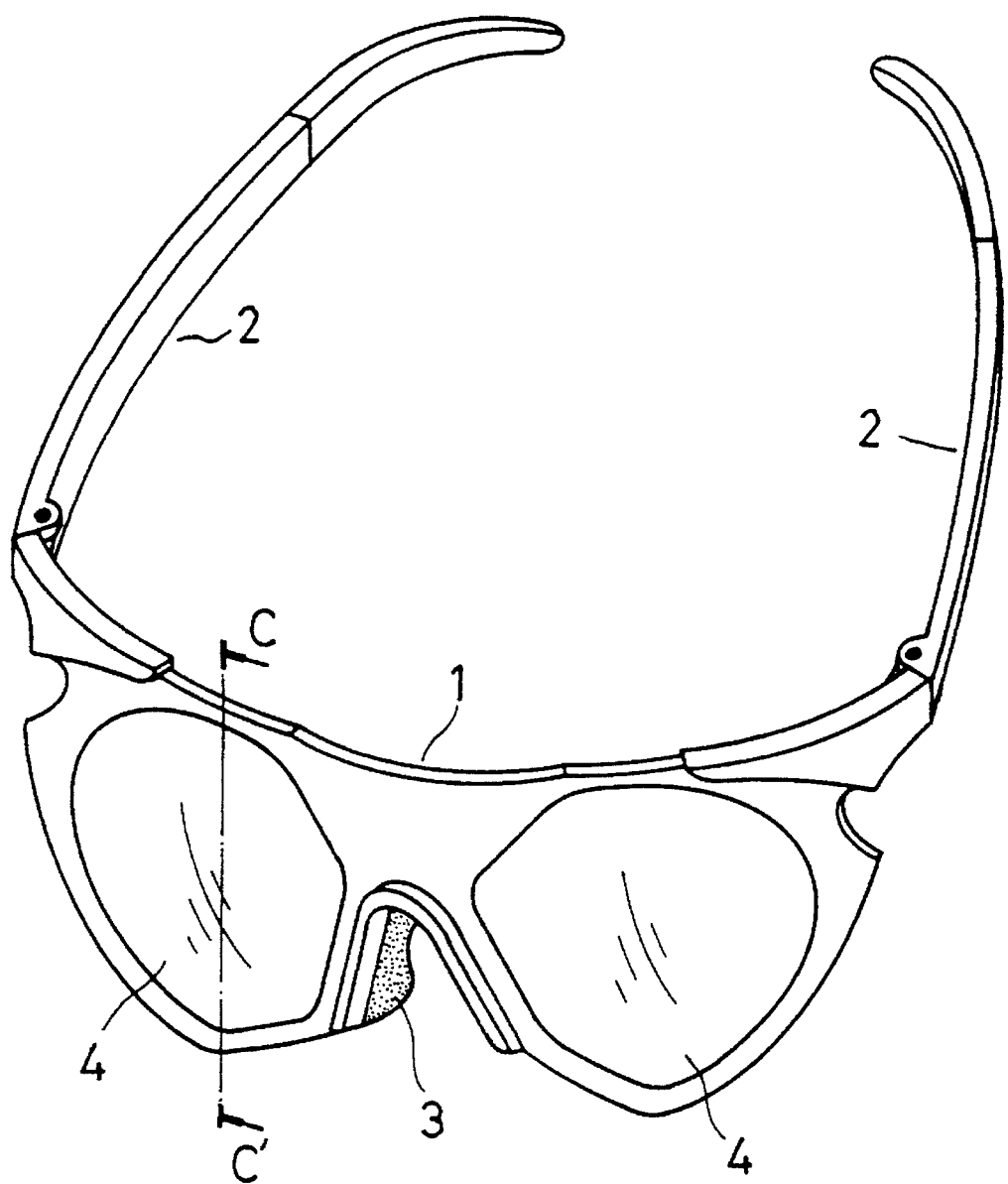
FIG. 6 is another perspective view of the eyeglasses with lenses replaceable in the present invention.
Figure 8:
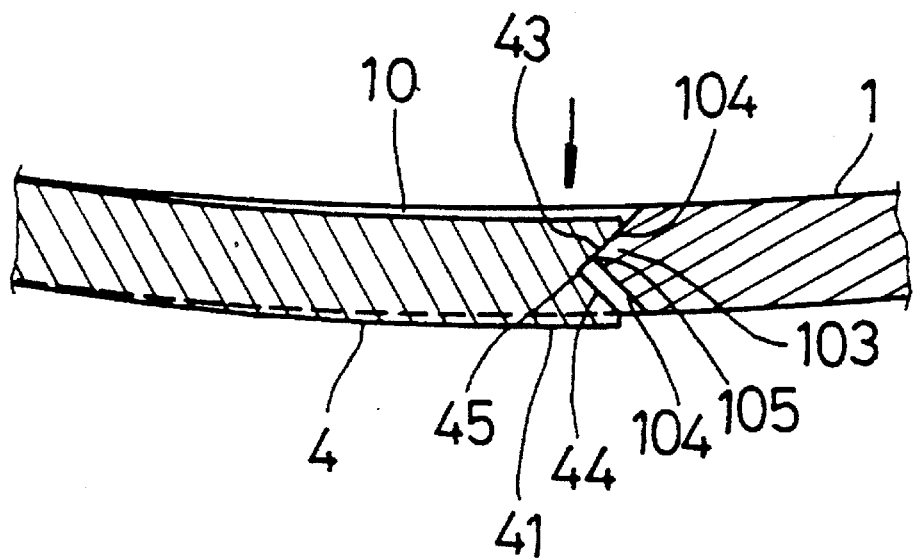
FIG. 8 is a cross-sectional view of a lens being separated from the lens frame in the eyeglasses with lenses replaceable in the present invention.

In assembling, referring to FIG. 1, firstly, the two connectors 20, 20 are connected with the connecting portions 1I, 11 of the lens frame 1, and next the nose piece 3 is combined with the curve 12 of the lens frame 1 by fitting the projections 13, 13 in the holes 30, 30. Then the two lenses 4, 4 are made to fit in the holes 10, 10, with the position portion 40 firstly engaging firmly with the position portion 100 of each hole 10 by means of the same wedge-shaped surfaces by pushing the fitting portion a fit forcibly as shown in FIG. 4. And the circumferential groove 42 of the lens 4 engages with the circumferential tip 105 of the contact ridge 103, with the stop surface 44 of the lens 4 contacting with the stop surface 104 of the contact edge 103, with the fitting portion 41 pushed a little to force the groove 42 completely fit with the ridge 103 of the hole 10 as shown in FIGS. 5 and 6.

Figure 7:
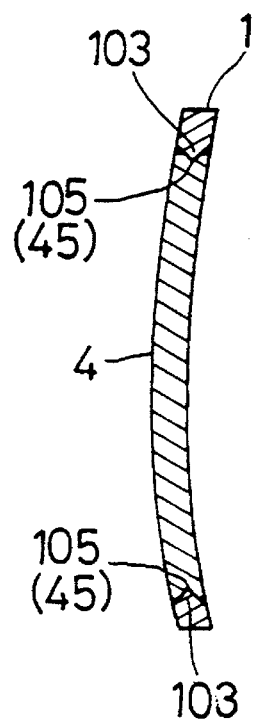
FIG. 7 is a cross-sectional view of line C—C' in FIG. 6.

As to the engagement of the lens 4 with the lens hole 10, as shown in FIG. 7, the bottom line 45 of the lens can always fit with the tip 105 of the contact edge 103 because of the wedge shape of the both, stabilizing the lens 4 in the hole 10 every time when a lens 4 is fitted therein. Although the lens frame 1 and the lenses 4, 4 are not formed as integral, they seems to be formed as integral because the lenses 4, 4 have the same curvature as the lens frame, except the color of-them being different. In case that the user wants to change the lenses 4, 4, he only have to push the fitting portion 41 of each lens 4, forcing the tip line 105 of the contact ridge 103 of the hole 10 slide along the slide surface 43 of the small angle until the fitting portion 41 separates from the contact ridge 103. Then the lens is already removed, and then new lenses can be placed in the holes 10, 10 in the same manner as described above.

As can be realized from the description mentioned above, this invention can be recognized to have the following advantages.

1. Lenses of different colors and shades can be used according to user's taste and a weather or an event.

2. Lenses can easily be changed, as they have the same shape, a wedge-shaped position portion and a nearly round fitting position as the holes 10 of the lens frame.

3. Lenses can be replaced by a user without any need of tools, and lenses can engage with the lens frame with easiness and correctness.

4. The lenses and the lens frame look like being formed as integral after they are combined together, because of the same curvature of the both, with color difference and shade only.

What is claimed is:

1. A pair of eyeglasses comprising:

a lens frame having two lens holes for fitting two lenses therein, a connecting portion respectively formed at two opposite ends for attachment to with two connectors, a curve at the middle portion sloping upward from below and having two spaced projections respectively at both sides for attachment of a nose piece, each lens hole having a wedge-shaped position portion and a curved fitting portion;

said two connectors respectively attached to said two connecting portions of said lens frame, each respectively having a middle hollow space for each said connecting portion to fit therein, two spaced holes in a wall of said hollow space for screws to fix said connecting portions with the connectors;

two temples having top ends pivotally connected to said two connectors and a curved end portion;

a nose piece shaped the same as the curve of said lens frame and having a plurality of holes to fit with said projections of said curve of said lens frame to attach said nose piece to said lens frame; and said two lenses fitting in said two lens holes of said lens frame; whereby said lens holes respectively each have a wedge-shaped first position portion, a curved first fitting portion, and a circumferential ridge having a wedge shape cross-section formed by two sloped lens frame surfaces intersecting with each other at a tip line; and each of said lens having a wedge-shaped second position portion, a curved second fitting portion, each correspondingly shaped to the first position portions and first fitting portions of each of said lens holes, and a circumferential groove having a wedge-shaped cross-section formed by a slide surface and a stop surface intersecting the slide surface at a groove bottom line, the slide surface located so as to slide across the tip line and the stop surface located so as to contact one of said two sloped lens frame surfaces so that each lens may be kept stabilized when the lens is fitted in the lens hole, each said lens being replaceable easily by removing from or fitting in each said lens hole so that lenses of different colors and shades may be used.

2. The pair of eyeglasses as claimed in claim 1, wherein the first fitting portions of each said lens hole of said lens frame has a wedge-shape cross-section comprising two sloping surfaces having different angles, and the second fitting portion of each said lens has a groove with a wedge-shape cross-section comprising sloping slide and stop surfaces having different angles to facilitate engagement with the lens frame.

3. The pair of eyeglasses as claimed in claim 1, wherein said circumferential groove bottom line of each of said lenses fits with the tip line of said circumferential contact ridge of each of said lens holes of said lens frame when each said lens is fitted in each said lens hole, to produce a locking effect.

4. The pair of eyeglasses as claimed in claim 1, wherein said lens frame and said lenses have the same thickness and the same curvature so that said lenses and the lens frame appear to be formed as an integral unit after they are combined together.

\* \* \* \* \*